(12) United States Patent
Igl et al.

(10) Patent No.: US 6,805,493 B2
(45) Date of Patent: Oct. 19, 2004

(54) OPTICAL CONNECTOR ASSEMBLY USING PARTIAL LARGE DIAMETER ALIGNMENT FEATURES

(75) Inventors: Scott A. Igl, St. Paul, MN (US); Michael A. Meis, Stillwater, MN (US); Gordon D. Henson, Lake Elmo, MN (US); Nicholas A. Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

(21) Appl. No.: 10/124,907

(22) Filed: Apr. 18, 2002

(65) Prior Publication Data

US 2002/0114589 A1 Aug. 22, 2002

Related U.S. Application Data

(60) Division of application No. 09/704,993, filed on Nov. 2, 2000, now Pat. No. 6,459,843, which is a continuation-in-part of application No. 09/201,798, filed on Nov. 30, 1998, now Pat. No. 6,367,985, which is a continuation-in-part of application No. 08/953,950, filed on Oct. 20, 1997, now Pat. No. 5,845,028, which is a division of application No. 08/614,412, filed on Mar. 12, 1996, now Pat. No. 5,778,123, application No. 10/124,907, which is a continuation-in-part of application No. 08/874,243, filed on Jun. 13, 1997, now Pat. No. 5,920,670, and a continuation-in-part of application No. 08/819,247, filed on Mar. 17, 1997, now Pat. No. 5,940,562, said application No. 08/874,243, is a continuation-in-part of application No. 08/660,296, filed on Jun. 7, 1996, now Pat. No. 5,727,097.

(51) Int. Cl.[7] .............................. G02B 6/00; G02B 6/36

(52) U.S. Cl. ....................................................... 385/88

(58) Field of Search ..................... 385/88–90, 52–56, 385/135–137, 138, 147

(56) References Cited

U.S. PATENT DOCUMENTS

| 3,864,018 A | 2/1975 | Miller |
| 3,871,935 A | 3/1975 | Gloge et al. |
| 3,920,432 A | 11/1975 | Smith |
| 4,023,887 A | 5/1977 | Speers ...................... 350/96 C |

(List continued on next page.)

FOREIGN PATENT DOCUMENTS

| DE | 3 409 641 | 9/1985 | ............. G03F/7/00 |
| EP | 0 540 850 A3 | 5/1993 | .................. 29/445 |
| EP | 0 550 973 A1 | 7/1993 | ............ G02B/6/42 |

(List continued on next page.)

OTHER PUBLICATIONS

Robert Morgan, "High–Performance, Proucible, Vertical-Cavity Lasers for Optical Interconnects", International Journal of High–Speed Electronics and Systems, vol. 5, No. 4, 1994, pp. 593–623.

(List continued on next page.)

*Primary Examiner*—Akm Enayet Ullah
(74) *Attorney, Agent, or Firm*—Gregg H. Rosenblatt

(57) ABSTRACT

A fiber optic connector having improved alignment and manufacturing characteristics over traditional connectors. A fiber optic connector of the present invention has a first connector ferrule and alignment means for aligning the first connector ferrule with a matching second connector ferrule. The fiber optic connector includes a first connector ferrule including a first mating surface. The mating surface defines at least one receiving cavity, and at least one protruding alignment rod is seated in the cavity and extends from the mating surface. The alignment rod has a diameter $D_1$ and protrudes from the mating surface a protrusion distance $p_1$, wherein $p_1 \leq 2D_1$. In an exemplary embodiment the rod has a spherical tip and $0.5D_1 \leq p_1 \leq 2D_1$.

20 Claims, 9 Drawing Sheets

U.S. PATENT DOCUMENTS

| | | | |
|---|---|---|---|
| 4,037,902 A | 7/1977 | Miller ........................ | 339/49 R |
| 4,087,155 A | 5/1978 | Deacon ...................... | 350/96.21 |
| 4,094,580 A | 6/1978 | Cook et al. ................ | 350/96.21 |
| 4,116,532 A | 9/1978 | Hubbard et al. ........... | 350/96.21 |
| 4,184,742 A | 1/1980 | Corrales .................... | 350/96.21 |
| 4,204,310 A | 5/1980 | Auracher et al. .......... | 29/445 |
| 4,217,029 A | 8/1980 | Kao ............................ | 350/96.21 |
| 4,279,466 A | 7/1981 | Makuch et al. ............ | 350/96.21 |
| 4,279,468 A | 7/1981 | Turley et al. .............. | 350/96.21 |
| 4,289,558 A | 9/1981 | Eichenbaum et al. | |
| 4,327,964 A | 5/1982 | Haesly et al. .............. | 350/96.2 |
| 4,601,535 A | 7/1986 | Tanaka et al. .............. | 350/96.2 |
| 4,607,911 A | 8/1986 | Rhodes ....................... | 350/96.2 |
| 4,712,861 A | 12/1987 | Lukas et al. ............... | 350/96.21 |
| 4,715,677 A | 12/1987 | Saito et al. | |
| 4,737,118 A | 4/1988 | Lockard ...................... | 439/289 |
| 4,784,457 A | 11/1988 | Finzel ......................... | 350/96.21 |
| 4,786,135 A | 11/1988 | Boero ......................... | 350/96.21 |
| 4,793,683 A | 12/1988 | Cannon, Jr. et al. | |
| 4,812,005 A | 3/1989 | Heywang .................... | 350/96.2 |
| 4,830,456 A | 5/1989 | Kakii et al. ................ | 350/96.2 |
| 4,953,944 A | 9/1990 | Moulin ....................... | 350/96.21 |
| 4,973,126 A | 11/1990 | Degani et al. .............. | 350/96.21 |
| 4,980,007 A | 12/1990 | Ferguson | |
| 4,983,012 A | 1/1991 | Saito et al. ................. | 350/96.21 |
| 5,080,461 A | 1/1992 | Pimpinella ................. | 385/65 |
| 5,121,457 A | 6/1992 | Foley et al. ................ | 385/89 |
| 5,123,073 A | 6/1992 | Pimpinella ................. | 385/59 |
| 5,151,964 A | 9/1992 | Carpenter et al. .......... | 385/59 |
| 5,183,409 A | 2/1993 | Clever et al. ............... | 439/291 |
| 5,208,889 A | 5/1993 | Cedrone et al. ............ | 385/114 |
| 5,214,730 A | 5/1993 | Nagasawa et al. .......... | 385/59 |
| 5,249,245 A | 9/1993 | Lebby et al. ............... | 385/89 |
| 5,257,332 A | 10/1993 | Pimpinella ................. | 385/59 |
| 5,257,334 A | 10/1993 | Takahashi ................... | 385/65 |
| 5,259,050 A | 11/1993 | Yamakawa et al. ........ | 385/59 |
| 5,268,981 A | 12/1993 | Shahid ........................ | 385/71 |
| 5,276,755 A | 1/1994 | Longhurst .................. | 385/88 |
| 5,287,426 A | 2/1994 | Shahid ........................ | 385/85 |
| 5,309,537 A | 5/1994 | Chun et al. | |
| 5,315,678 A | 5/1994 | Maekawa et al. .......... | 385/59 |
| 5,333,225 A | 7/1994 | Jacobowitz et al. ........ | 385/59 |
| 5,339,376 A | 8/1994 | Kakii et al. ................ | 385/71 |
| 5,416,868 A | 5/1995 | Kakii et al. ................ | 385/80 |
| 5,420,952 A | 5/1995 | Katsura et al. ............. | 385/80 |
| 5,422,971 A | 6/1995 | Honjo et al. ............... | 385/80 |
| 5,430,819 A | 7/1995 | Sizer, II et al. ............ | 385/59 |
| 5,500,914 A | 3/1996 | Foley et al. ................ | 385/77 |
| 5,500,915 A | 3/1996 | Iwatsuka et al. ........... | 385/78 |
| 5,539,848 A | 7/1996 | Galloway ................... | 385/89 |
| 5,548,677 A | 8/1996 | Kakii et al. ................ | 385/92 |
| 5,574,814 A | 11/1996 | Noddings et al. .......... | 385/90 |
| 5,727,097 A | 3/1998 | Lee et al. .................... | 385/58 |
| 5,778,123 A | 7/1998 | Hagan et al. ............... | 385/76 |
| 5,845,028 A | 12/1998 | Smith et al. ................ | 385/59 |
| 5,920,670 A | 7/1999 | Lee et al. .................... | 385/78 |
| 5,940,562 A * | 8/1999 | Henson et al. .............. | 385/88 |
| 6,367,985 B1 * | 4/2002 | Lee et al. .................... | 385/59 |

FOREIGN PATENT DOCUMENTS

| | | | |
|---|---|---|---|
| EP | 0 613 031 A1 | 8/1994 | |
| EP | 0 707 225 A1 | 4/1996 | ............ G02B/6/38 |
| JP | 56 060 406 | 5/1981 | |
| JP | 405157943 A | 6/1993 | ............ G02B/6/38 |
| JP | Hei 5-20340 | 1/1995 | |
| JP | HEI 7-20340 | 1/1995 | |
| WO | 94/28448 | 12/1994 | ............ G02B/6/00 |
| WO | 95/34836 | 12/1995 | ............ G02B/6/42 |
| WO | 86/01306 | 2/1996 | ............ G02B/6/38 |
| WO | 97/20344 | 6/1997 | ........... H01L/21/50 |
| WO | 97/34179 | 9/1997 | ............ G02B/6/38 |
| WO | 98/57208 | 12/1998 | ............ G02B/6/38 |

OTHER PUBLICATIONS

Alcoa Fujikura Ltd. Technical Brochure, 2/95.

AT&T Multifiber Optical Cable Assemblies Product Catalog, 9/93.

MACII™ Connector Family Technical Overview, pp. 83–88, no date.

* cited by examiner

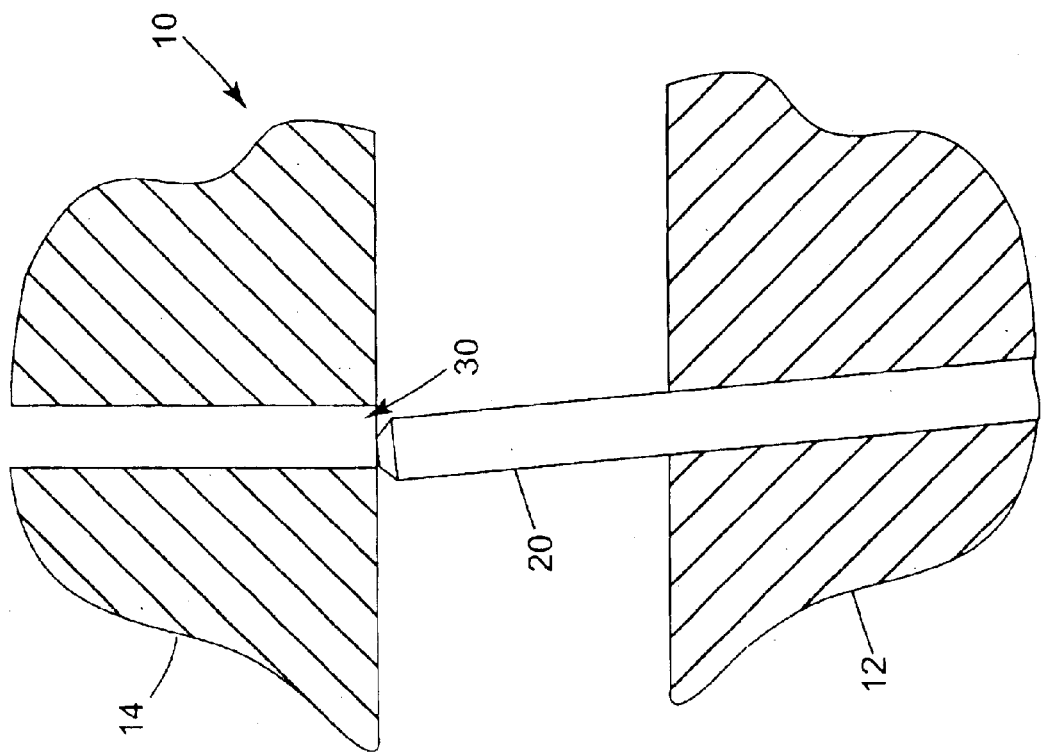
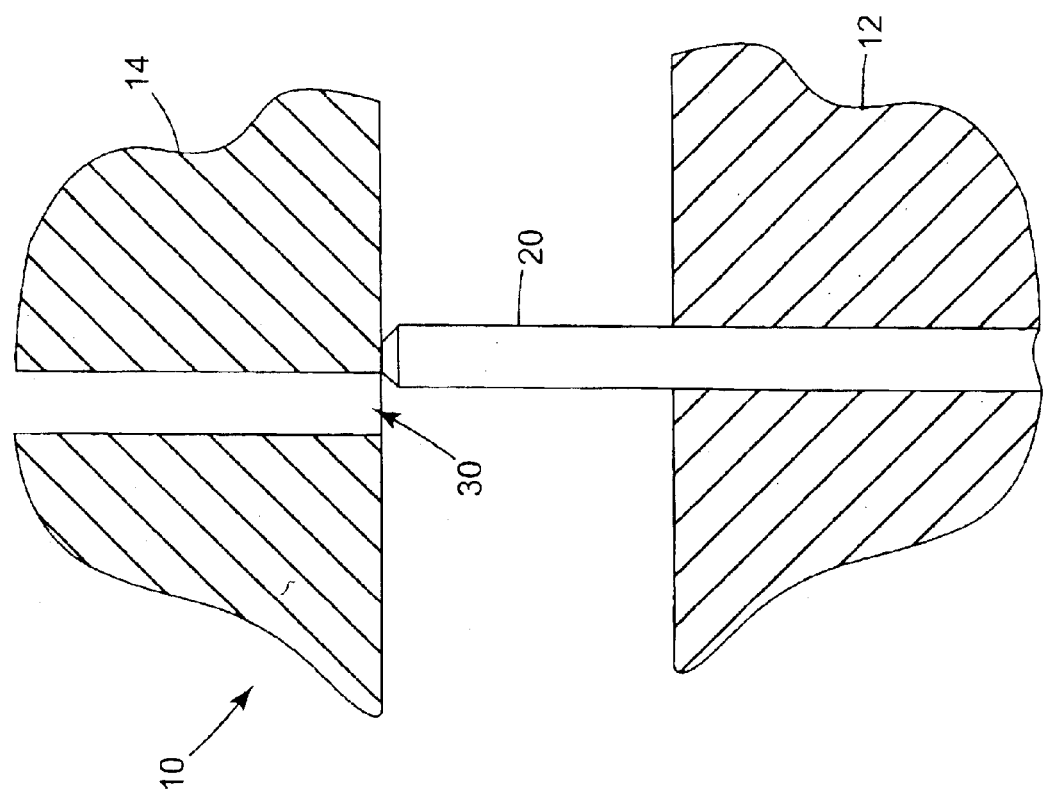

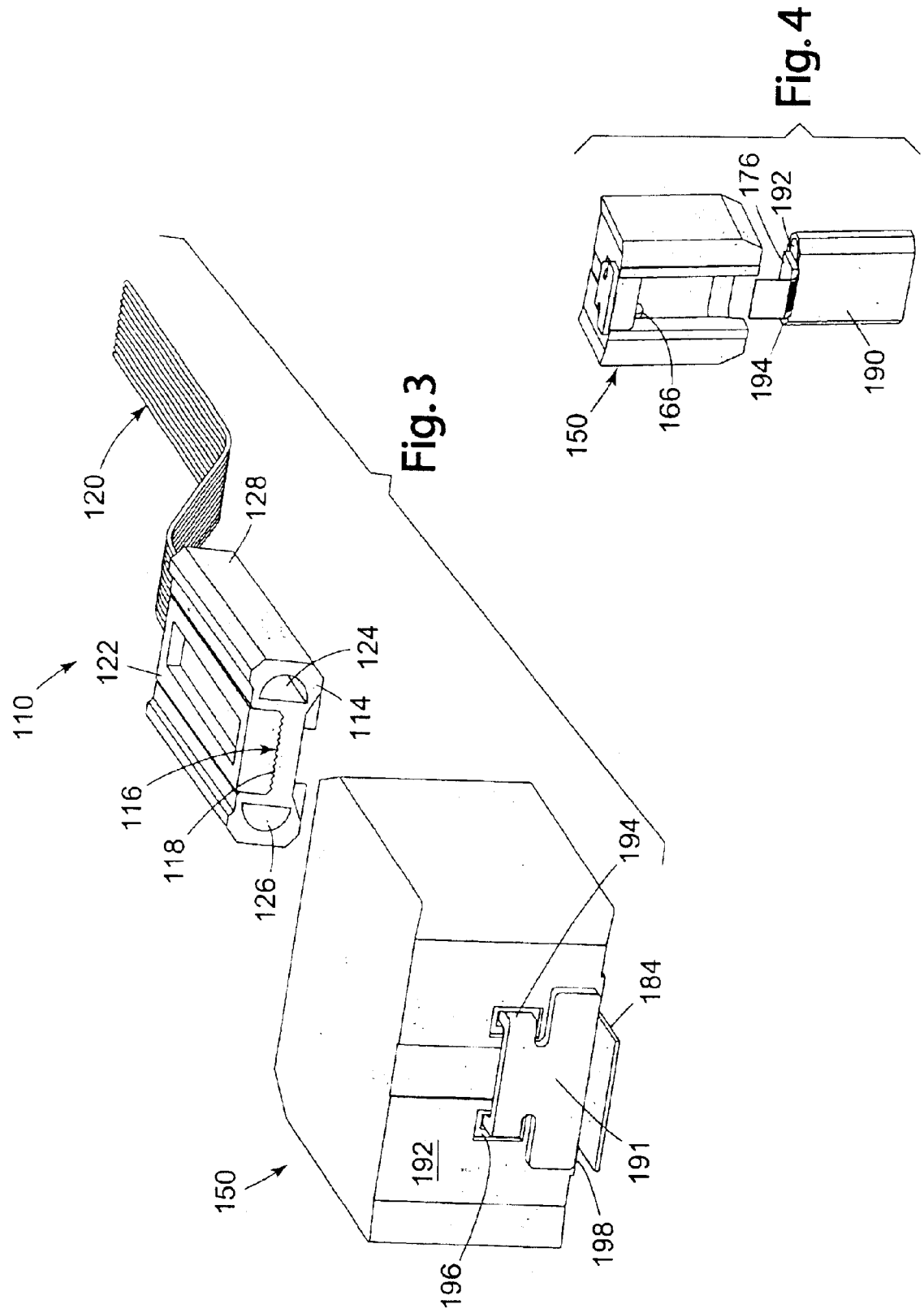

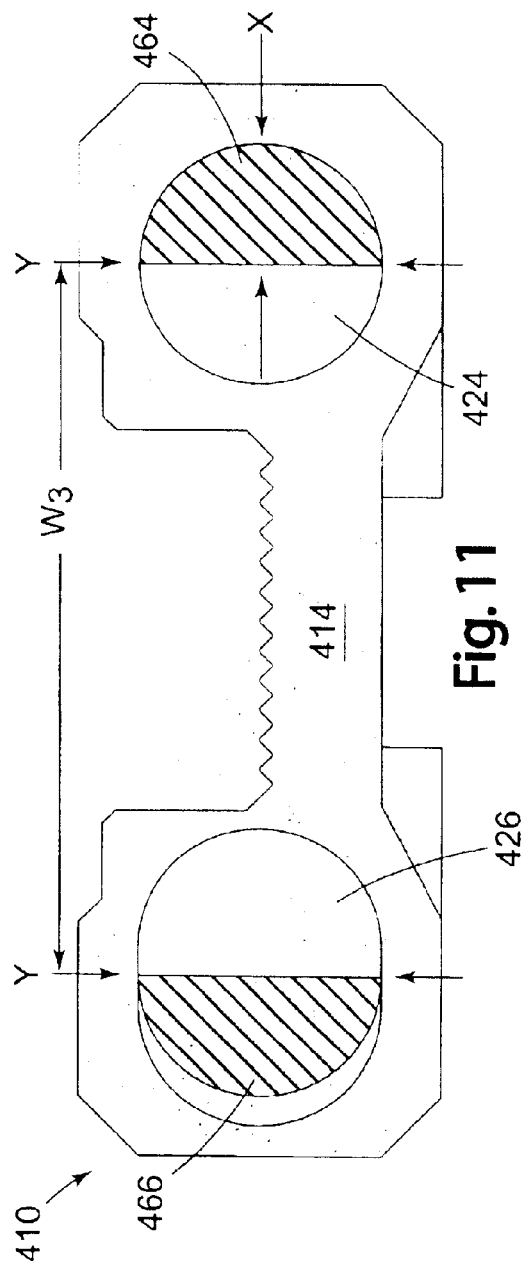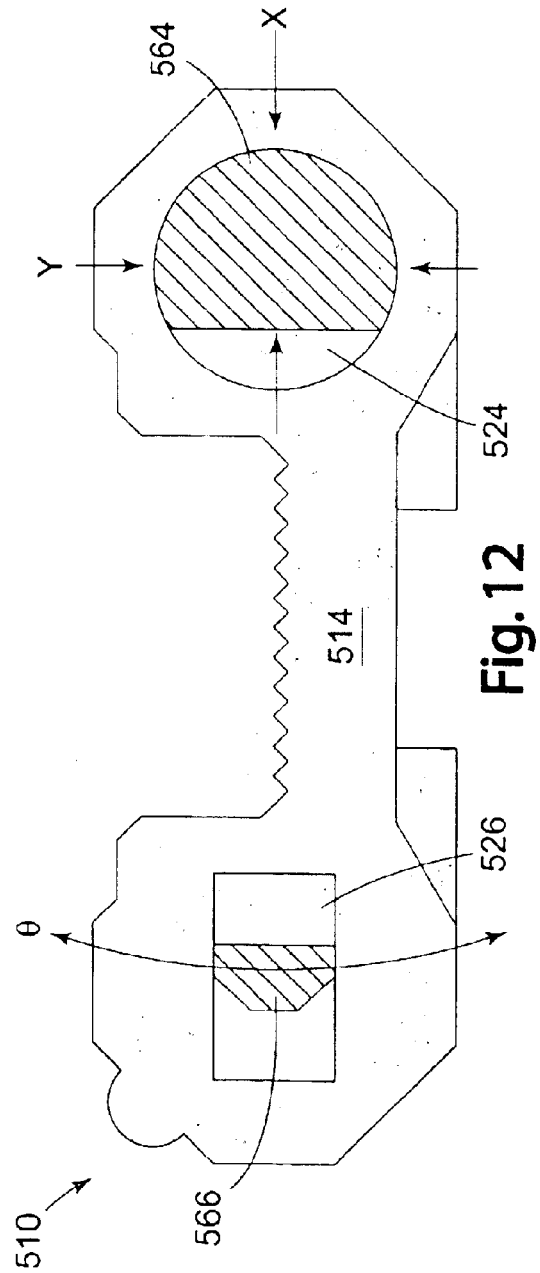

OPTICAL CONNECTOR ASSEMBLY USING PARTIAL LARGE DIAMETER ALIGNMENT FEATURES

RELATED APPLICATIONS

This application is a divisional of U.S. Ser. No. 09/704,993, filed Nov. 2, 2000, now U.S. Pat. No. 6,459,843, which was filed as a continuation-in-part of co-pending and co-assigned U.S. application Ser. No. 09/201,798, entitled "OPTICAL CONNECTOR USING LARGE DIAMETER ALIGNMENT FEATURES", filed Nov. 30, 1998, now U.S. Pat. No. 6,367,985; which is a continuation-in-part of U.S. application Ser. No. 08/953,950, entitled "ALIGNMENT ASSEMBLY FOR MULTIFIBER OR SINGLE FIBER OPTICAL CABLE CONNECTOR", filed Oct. 20, 1997 and issued as U.S. Pat. No. 5,845,028; which is a division of U.S. application Ser. No. 08/614,412, filed Mar. 12, 1996 and issued as U.S. Pat. No. 5,778,123. The present application also is a continuation-in-part of U.S. patent application Ser. No. 08/819,247, entitled "STUBLESS OPTOELECTRONIC DEVICE RECEPTACLE", filed Mar. 17, 1997, now U.S. Pat. No. 5,940,562. Furthermore, the present application also is a continuation-in-part of U.S. patent application Ser. No. 08/874,243, entitled "MULTIPLE ALIGNMENT CONNECTOR FERRULE", filed Jun. 13, 1997, now U.S. Pat. No. 5,920,670, which is a continuation-in-part of U.S. patent application Ser. No. 08/660,296, entitled "PULL-PROOF FIBER OPTIC ARRAY CONNECTOR", filed Jun. 7, 1996 which issued as U.S. Pat. No. 5,727,097. All of the related applications are commonly assigned to the Assignee of the present invention and the disclosures of the above which are herein incorporated by reference.

GOVERNMENT RIGHTS

The present invention was made with Government support under Contract F30602-97-2-0120 awarded by the U.S. Air Force. The Government has certain rights in this invention.

FIELD OF THE INVENTION

The present invention relates generally to connector assemblies for optical fibers and devices. In particular, the present invention relates to an opto-electronic connector assembly including a semi-cylindrical large diameter alignment feature.

BACKGROUND OF THE INVENTION

Optical fibers offer greatly increased bandwidth, transmission capability and transmission characteristics over traditional copper wires. Use of optical cables has generally been limited to large scale long haul trunking installations, such as those of the telecommunications industry, where the improved transmission characteristics of the optical fibers justify the greater expense and typical difficulty associated with their manufacturing and installation. Nevertheless, as demands on communication media and data volume continue to increase, the advantages of using optical cable for transmission of signals across shorter distances, or for interconnecting local devices, continues to grow. With this growth has come a need to connect fiber optic cables accurately and economically to each other and to a multiplicity of devices. The ability to accurately connectorize optical fibers used for data transmission with electronic devices has become vital to the design of many opto-electronic applications.

The use of optical fibers and the coupling of the optical fibers with electronic devices do present some difficulties. Optical fibers are hair-thin waveguides that conduct light signals. To avoid losing or degrading the light signals being transmitted, there is a need for precise alignment and coupling any time optical fibers are connected to each other or to opto-electronic or optical devices. Optic transfer efficiency is the term used to measure the ability of a connector to accurately couple the transmitted signals.

Of considerable relevance to the problem of developing practical fiber optic connectors is the question of the optic transfer efficiency at the connector. Various factors affect the optic transfer efficiency at a connector including (a) gap separation at the point of abutment, (b) lateral separation due to axial misalignment, and (c) thermal expansion characteristics of connectors.

Numerous optical cable connectors have been developed to aid in the connection of fiber optic cables. As data requirements grow, single fiber cables have given way to high-precision multiple fiber cables, such as parallel ribbon cables including a plurality of optical fibers aligned in parallel. As the number of fibers grow, such do the difficulties in maintaining the transfer efficiency of the connector.

Examples of known multi-fiber connectors include the MAC™ connector by Berg Electronics and the MT Connector by U.S. Conec. Further examples of optical connectors are illustrated in U.S. Pat. No. 5,420,952 to Katsura, et al.; U.S. Pat. No. 5,276,755 to Longhurst; U.S. Pat. No. 5,500,915 to Foley et al.; U.S. Pat. No. 4,784,457 to Finzell; U.S. Pat. No. 5,430,819 to Sizer, II, et al.; and U.S. Pat. No. 5,287,426 to Shahid.

Many of the known connectors have disadvantages associated with them. An MT-type connector, a portion of which is illustrated in FIGS. 1A and 1B, is one of the most common connectors currently used. MT Connector 10 includes a first alignment block, a ferrule 12, and a second alignment block, and a receptacle or mating ferrule 14. The term alignment block is meant to include ferrules, receptacles, or any other mating blocks. The ferrule 12 has protruding long pins 20. The proposed TIA/EIA-604-5 MT connector intermateability standard specifies that the alignment pins must protrude at least 2.285 pin diameters (1.6 mm protrusion for a 0.7 mm diameter pin) from the face of the ferrule.

Long thin pins, such as those of the MT connector, attempt to control movement of the connector in the x, y and z axes. Long pins may help achieve suitable optical connections for some applications and the coupling of pins and holes may be intuitive to users. However, the use of such long pins does present significant coupling, alignment, durability and manufacturing disadvantages.

As illustrated in FIG. 1, during coupling of an MT-type connector, the ferrule 12 is interference fit upon a receptacle 14. The receptacle 14 defines a receiving orifice or hole 30. The pin 20 is inserted into the corresponding receiving hole 30. Significant insertion force is needed to seat each small diameter (~0.7 mm) pin fully into the respective hole. It has been calculated that the interference fit of a nominal MT connector pin inserted into a matching receptacle hole could require approximately six Newtons of force to fully seat. If the pins are not fully seated, an air gap between the two mating alignment blocks results that can cause severe light loss.

Correct alignment of the pins is very important before coupling. FIG. 1A illustrates a 0.5 mm lateral misalignment of the 0.7 mm MT connector pin 20. The small diameter of the pin 20 and of the matching receiving hole 30 results in complete failure to couple even under very small (e.g., half a millimeter) lateral misalignment.

FIG. 1B illustrates the effects of angular misalignment of pin 20. The effects of even a small angular misalignment are magnified by the length of the pin, even a small angular misalignment (e.g., 5 degrees) may again result in complete failure to couple.

If the pin 20 is not perfectly aligned before engagement into the mating hole 30, the pin 20 may miss the hole 30 and crack the mating ferrule 14 causing a catastrophic failure. The long and thin metal pins 20 and 22 also are liable to bend during insertion and withdrawal and damage the mating ferrule 14 on subsequent insertions. The high interference fit of the long pin to the mating hole can cause the hole to be "skived" and deposit unwanted debris onto the connector mating face, which can cause signal failure. Because the pins protrude so far from the mating face of the MT, the mating face is difficult to clean.

Manufacture of an MT connector further requires tight control of the tolerances of at least nine critical dimensions: (1) pin diameter, (2) pin straightness, (3) pin taper, (4) hole diameter, (5) hole straightness, (6) hole angle, (7) hole taper, (8) hole placement relative to matching hole, (9) hole placement relative to fibers. Accordingly, the use of traditional alignment pins further drives up manufacturing difficulty and costs.

A further consideration is that the long protruding metal MT alignment pins have a tendency to act as "antennas" and may cause electromagnetic interference when placed near high frequency components. This interference may in turn cause signal interference to other equipment and components.

An alternative optical connector design is disclosed in U.S. Pat. No. 5,778,123, entitled "Alignment Assembly for Multifiber or Single Fiber Optical Cable Connector", which is commonly assigned with the present invention to Minnesota Mining and Manufacturing and which is hereby incorporated by reference. The patent discloses a "ball and socket" alignment structure where an opening or socket in a ferrule seats a ball, rather than a long pin. The opening has a depth $d_1$. The ball has a radius R, where $R>d_1$. The ball and socket structure offers significant advantages as the design does not overconstrain the z-axis alignment and requires control of only two manufacturing tolerances: the size of the alignment ball, which is easily controllable, and the spacing between the two openings.

However, the ball offers only a limited bonding surface to the associated alignment hole. A limited bonding surface may result in inadequate bonding of the ball to the ferrule. Also, the ball and socket design may be susceptible to damage from overpolishing of the ferrule and fiber ends. Overpolishing a ball-in-socket ferrule face may damage or obliterate the ball alignment opening or chamfer, thus inhibiting accurate attachment of the ball.

Another issue with traditional connectors has been the electrical interconnection of opto-electronic components embedded in a receptacle. Manufacturing limitations encourage the placement of the grounding contact for traditional VCSEL on a back plane of the integrated circuit (see, e.g., "High-Performance, Producible Vertical-Cavity Lasers for Optical Interconects", R. Morgan, Intl. J. of High Speed Elect. and Syst., Vol. 5, No 4 (1994), relevant portions of which are hereby incorporated by reference). Once the opto-electronic component is embedded in a receptacle, a robust electrical connection to the grounding back-plane becomes difficult.

The opportunity remains for an improved optical and opto-electronic connector assembly.

SUMMARY OF THE INVENTION

The present invention is an optic and opto-electronic connector having improved alignment and manufacturing characteristics over traditional connectors. The connector assembly of the present invention includes a first alignment block including a first mating surface. The alignment blocks may be optical fiber ferrules, receptacles including opto-electronic or optical devices, or other optical elements in need of alignment. At least one large diameter semi-cylindrical protruding alignment peg extends from the mating surface. The term semi-cylindrical is meant to include pegs having a circular, semi-circular, elliptical and other suitable outer cross-sectional peripheries, as long as the outer periphery may be inscribed in at least a 180 degree arc. The term large diameter refers to alignment pegs having a diameter $D_1$ and protruding from the mating surface a protrusion distance $p_1$, wherein $p_1 \leq 2D_1$. The alignment peg may have a hemispherical tip.

The connector further may include a second alignment block having a second mating surface defining a first receiving cavity aligned opposite the first alignment peg, the first receiving cavity having a depth $H_1$ wherein and $p_1 \leq H_1$. In an exemplary embodiment, $0.5D_1 \leq p_1 \leq 2D_1$ and the peg is molded as part of the first alignment block. In other embodiments, the first alignment block defines a seating orifice and the alignment peg comprises a metal rod seated in the orifice.

A second alignment peg may extend from either one of the alignment blocks to match a second receiving cavity defined by the other alignment block, wherein the second receiving cavity is configured to align with and receive the second alignment peg. In one embodiment, the second alignment peg is semi-cylindrical, has a major diameter $D_2$ and protrudes from the mating surface of the one alignment block a protrusion distance $p_2$, wherein $p_2 \leq 2D_2$. The second receiving cavity has a depth $H_2$, wherein $p_2 \leq H_2$.

The first alignment block may includes both the first and the second alignment pegs, one peg and one receiving cavity or two receiving cavities. In another exemplary embodiment, the first and second alignment pegs have a convex outer edge portion and a non-convex outer edge portion, wherein the non-convex edge portions of the first and second alignment pegs are opposite to each other. An optical fiber array is placed between the opposing non-convex edge portions. An opto-electronic device also may be placed between the opposing non-convex edge portions. In such an embodiment, the second alignment block includes the first and the second receiving cavities, the first and second cavities having a concave interior edge portion and a non-concave interior edge portion, wherein the non-concave interior edge portions of the first and second cavities are opposite each other. An optical fiber array may be placed between the opposing non-concave interior edge portions.

BRIEF DESCRIPTION OF THE DRAWINGS

FIG. 1A is a cross-sectional view of a laterally misaligned pin of an MT-type connector.

FIG. 1B is a cross-sectional view of an angularly misaligned pin of the connector illustrated in FIG. 1A.

FIG. 3 is a back/side isometric view of the opto-electronic connector assembly illustrated in FIG. 2.

FIG. 4 is a top/side isometric view of a step in the assembly process of the opto-electronic connector assembly illustrated in FIG. 2.

FIG. 11 is an elevation view of the mating face of a third embodiment of a ferrule in accordance with the present invention.

FIG. 12 is an elevation view of the mating face of a fourth embodiment of a ferrule in accordance with the present invention.

DETAILED DESCRIPTION OF THE INVENTION

Figure 2:
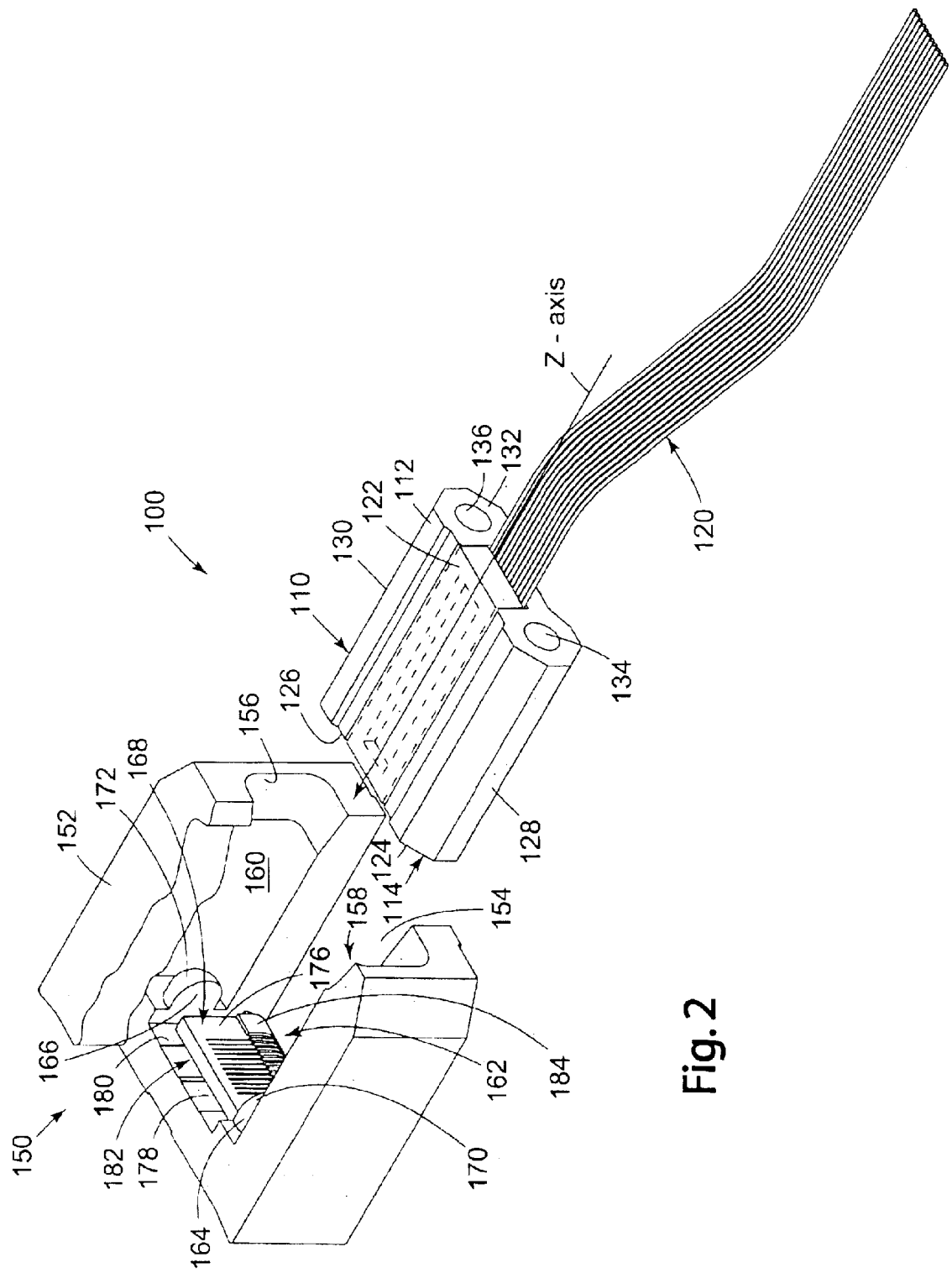
FIG. 2 is a front/side isometric view of an opto-electronic connector assembly in accordance with the present invention.

FIGS. 2–8 illustrate an exemplary embodiment of a connector assembly 100 in accordance with the present invention. The term connector in the present invention is meant to include devices for coupling and aligning two or more optical fiber cable ends, an optical fiber cable end with an optical device, or two or more optical devices. The term optical device includes opto-electronic devices. Accordingly, those skilled in the art will readily appreciate that the present invention may be utilized to align two optical fiber connector ferrules to one another, or alternately, to align one optical fiber ferrule to an optical source, detector, or other optical device.

The connector assembly 100 includes a first alignment block 110 and a second alignment block 150. In the present exemplary embodiment, the connector assembly 100 is symmetrical with respect to the longitudinal z-axis. The first alignment block 110 of the connector assembly 100 comprises an optical fiber connector ferrule. The second alignment block 150 comprises an opto-electronic receptacle having a body 152. Those skilled in the art will recognize that in other embodiments, the connector assembly may comprise different combinations of alignment blocks, such as two ferrules, two receptacles, a ferrule and an optical element (such as a prism, lens, etc.) or other combinations.

For descriptive purposes, the longitudinal z-axis of the connector assembly 100 is defined by the direction along which the ferrule 110 receives and aligns optical fibers 120. The ferrule 110 includes a body 112 having a mating face or surface 114 (see FIGS. 3 and 8) located at a front longitudinal end of the body 112 (the distal end in FIG. 2) and a fiber-receiving surface 116 located on a top middle portion of the body 112. The mating surface 114 of the ferrule 110 defines a first and a second receiving cavity 124 and 126.

The fiber-receiving surface 116 includes a plurality of v-grooves 118 that retain and align one or more optical fibers 120 of an optical fiber cable array in parallel. In the present embodiment, an array of optical fibers 120 is bonded into the alignment ferrule 110. The v-grooves 118 allow for top loading of the fibers 120 into the ferrule 110. A cover 122 is mounted, such as by mechanical and/or adhesive methods (e.g., interference fit, latches, bending and crimping, welding), over the parallel-aligned fibers to further retain the fibers in the desired alignment. The v-grooves 118 and the cover 122 provide an accurate longitudinal structure that aligns the fibers 120 in the array vertically and horizontally with respect to each other. The array is also precisely aligned to the receiving alignment holes 124 and 126 in the mating face 114 of the ferrule. The fiber faces of the optical fibers 120 are polished to optical clarity.

In the present exemplary embodiment, the ferrule body 112 and the receptacle body 152 are injection molded of a thermoplastic, such as Fortron 6165A6 from the Ticona Company, in Summit, N.J. The ferrule and receptacle bodies also may include other suitable materials including metal, ceramic, thermoset plastic, or other materials having the desired thermal stability and affording the desired manufacturing precision. Post-manufacturing processes, such as grinding, may be used to help achieve the desired precision.

The receiving cavities 124 and 126 each have respectively a diameter $d_1$ and $d_2$ and a depth $H_1$ and $H_2$. The receiving cavities 124 and 126 are semi-cylindrical. The term semi-cylindrical in the present description is meant to include shapes having a cross-sectional periphery wherein the outer edges of the cross-sectional periphery generally can be inscribed within at least a 180 or more degree elliptical curve or arc. Exemplary cross-sectional shapes may include a semi-circular curve or a convex polyhedron. In the present exemplary embodiment, the receiving cavities 124 and 126 define right semi-circular cylindrical holes and corresponding pegs 164 and 166 have right semi-circular lateral cross-sections.

The ferrule 110 is a female alignment block, as the mating surface 114 includes only receiving cavities. In alternative embodiments, the ferrule 110 may be a male alignment block (such as alignment block 150) including one or more alignment pegs or a hybrid alignment block having one alignment peg and one receiving cavity.

The ferrule body 112 also includes exterior geometrical fit features in the form of polyhedral side edges 128 and 130. The body 112 also may include a rear-face mating surface 132, defining a second set of rear-facing receiving apertures 134 and 136.

The alignment block 150 includes the receiving receptacle body 152 defining a ferrule-receiving cavity 154. The ferrule-receiving cavity 154 has internal walls having a complementary shape to the alignment block 110. The receptacle body 152 includes tapering lead-in transition portions 156 defining the mouth of the ferrule-receiving cavity 154 and polyhedral-shaped interior side portions 158 and 160 that match the outside geometry of the ferrule side edges 128 and 130, respectively.

As illustrated in the alternative embodiment illustrated in FIG. 12, the geometry of the side edges of the ferrule may be keyed with corresponding receptacle geometry to allow insertion of a ferrule in only one orientation.

The receptacle body 152 further defines a second mating surface 162 located at a longitudinal far end of the ferrule-receiving cavity 154. The mating surface 162 includes a first and a second semi-cylindrical alignment peg 164 and 166 and a device receiving back-plane 168 placed between the pegs 164 and 166.

Figure 9A:
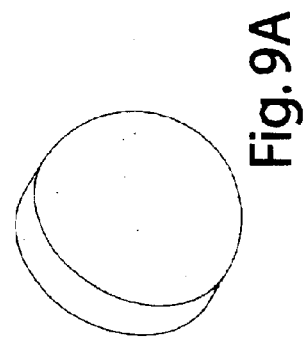
FIG. 9 is a detailed isometric view of alignment pegs in accordance with the present invention.
Figure 9B:
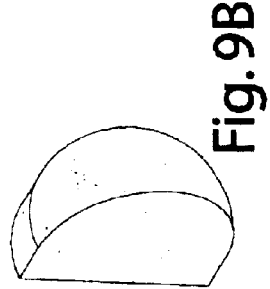
Figure 9C:
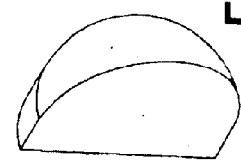

FIG. 9 illustrates several exemplary semi-cylindrical peg designs in accordance with the present invention. FIG. 9A shows a full circular peg. FIG. 9B shows a semi-circular cross-section peg. FIG. 9C shows a peg having a cross-sectional profile including an outer semi-circular periphery and an inner concave portion. In the embodiment illustrated in FIG. 2, the alignment pegs 164 and 166 have a semi-circular cross-section and have a spherical diameter $D_1$ and $D_2$ respectively. In the present embodiment, $D_1=D_2=d_1=d_2=2.0$ mm. The alignment pegs 164 and 166 protrude a distance $p_1$ and $p_2$ respectively from the second mating surface 162 and have semi-hemispherical ends 170 and 172, respectively. In the present embodiment, $p_1=p_2=1.5$ mm. A desired relationship between the protrusion distance p for a hemispherical tipped rod is between 0.5 to 2 times the maximum diameter D of the peg (i.e., $0.5\ D \leq p \leq 2.0\ D$), for a sphere-ended post. For a hemispherically tipped peg, a distance $p=0.5\ D$ equals the radius of the sphere, thus allowing the full diameter of the peg to be available for alignment with an opposing receiving cavity. Also, the end geometry of the tips of the alignment peg may be a variety of shapes, such as spherically radiused, chamfered, geodesic sloped, or other suitable shapes. If the peg tip is not hemispherical, the peg could protrude less than 0.5 diameters, while preferably allowing the full diameter of the peg to be exposed for aligning the mating connector.

The pegs 164 and 166 are molded into the body 152 of the alignment block 150. The novel concept of molding the large diameter pegs as part of the receptable body 152 aids in achieving the semi-cylindrical shape of the pegs. Furthermore, molded plastic pegs do not act as antennas that may cause electromagnetic interference.

In alternative embodiments, the pegs 164 and 166 may be semi-cylindrical rods made of hard, durable materials, such as stainless steel alloy 303 SS, plastic, other metals or alloys, ceramic, or other suitable materials, inserted into seating cavities. The receptacle alignment pegs may be fully round or partially round in order to accommodate the opto-electronic device and still provide precise alignment.

Figure 6:
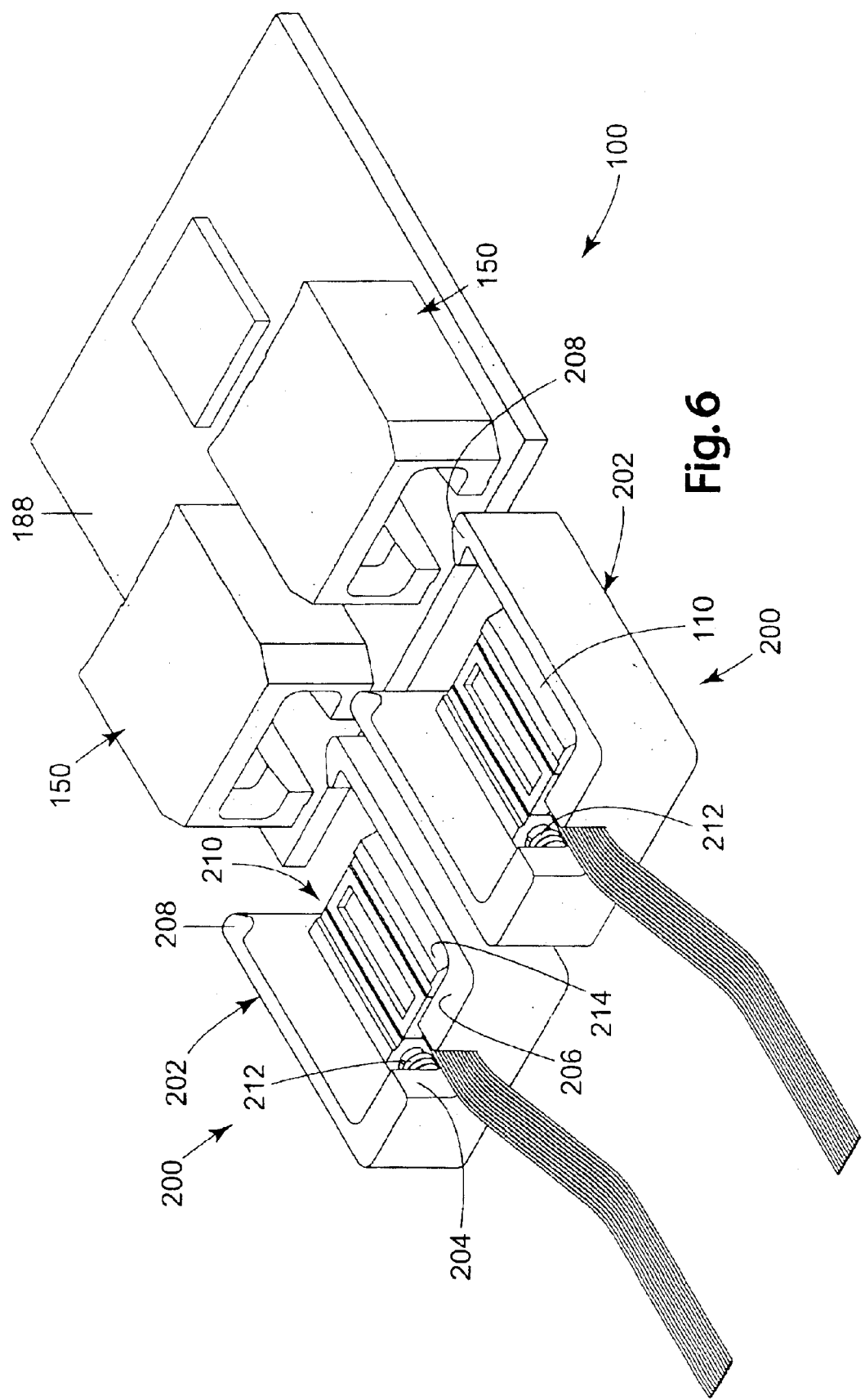
FIG. 6 is a front/side isometric view of a pair of opto-electronic connector assemblies, such as those illustrated in FIG. 5, prior to connectorization.

As illustrated in FIGS. 2, 3, and 6, during coupling, the alignment block 110 is placed opposite the matching alignment block 150. The peg 164 is aligned opposite the matching receiving cavity 124 and the peg 166 is aligned opposite the matching receiving cavity 126. $H_1 \geq p_1$ and $H_2 \geq p_2$. When the corresponding pegs and cavities are coupled, the opto-electronic device and the optical fibers are optically aligned.

The diameter D is meant to be measured as the maximum cross-sectional thickness of the peg. The diameter of $d_1$ and $d_2$ the receiving cavities 124 and 126, depending on the material used for the body, the pegs and the desired fit, may be slightly larger, equal or even smaller than D, as long as the desired x and y constraint is maintained within acceptable parameters. One advantage of the present invention is that generally it is easier to control the dimensions of large diameter round apertures and cylindrical pegs than of small or irregular pins or features.

The receptacle 150 further includes an opto-electronic device 176, such as a vertical cavity surface emitting laser (VCSEL) integrated circuit, aligned against the back plane 168 and with respect to the pegs 164 and 166. The back plane 168 includes a recessed attachment area 178 placed between two alignment ledges 180. The attachment area 178 allows for bonding of the opto-electronic device by accommodating the thickness of a bonding layer 182. The bonding layer 182 may include suitable adhesives or solder.

Figure 8:
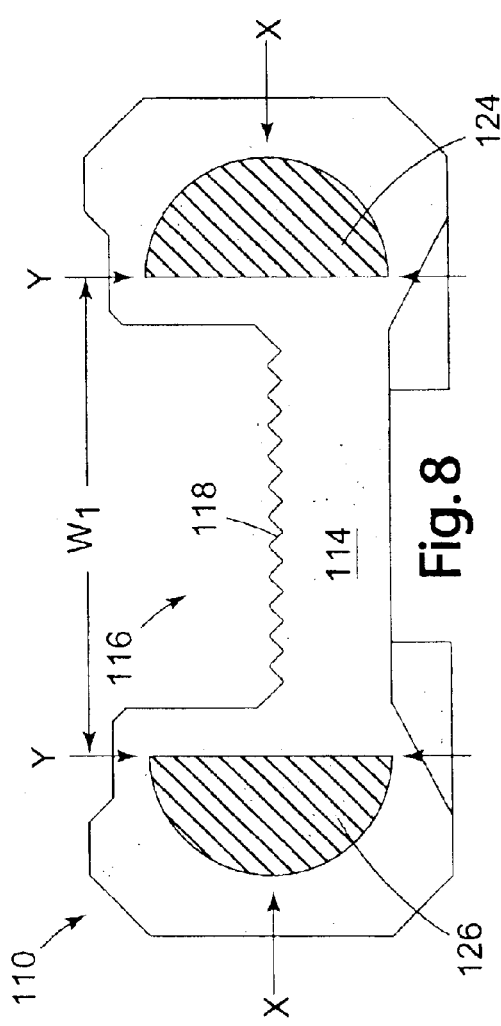
FIG. 8 is an elevation view of the mating face of the ferrule illustrated in FIG. 2.

A plan view of the mating surface 114 of the ferrule 110 is illustrated in FIG. 8. The first and the second receiving cavities 124 and 126 have a concave or flat interior edge portion and a non-concave interior edge portion, wherein the non-concave interior edge portions of the first and second cavities are opposite each other. The optical fiber array 120 may be placed along the v-grooves 118 between the opposing non-concave interior edge portions, thus minimizing the required connector width. The matching first and second alignment pegs 164 and 166 have a convex (see FIG. 9) or flat outer edge portion and a non-convex outer edge portion, wherein the non-convex edge portions of the first and second alignment pegs are opposite to each other. In an alternative embodiment including two fiber array ferrules, an optical fiber array may be placed between the opposing non-convex edge portions. In the present embodiment, the opto-electronic device 176 may be placed between the opposing non-convex edge portions. The distance and the position of the v-grooves or of the fiducials for alignment of the opto-electronic device are known, such that when the corresponding pegs and cavities are matched, the opto-electronic device 176 and the optical fibers 120 become aligned.

Figure 5:
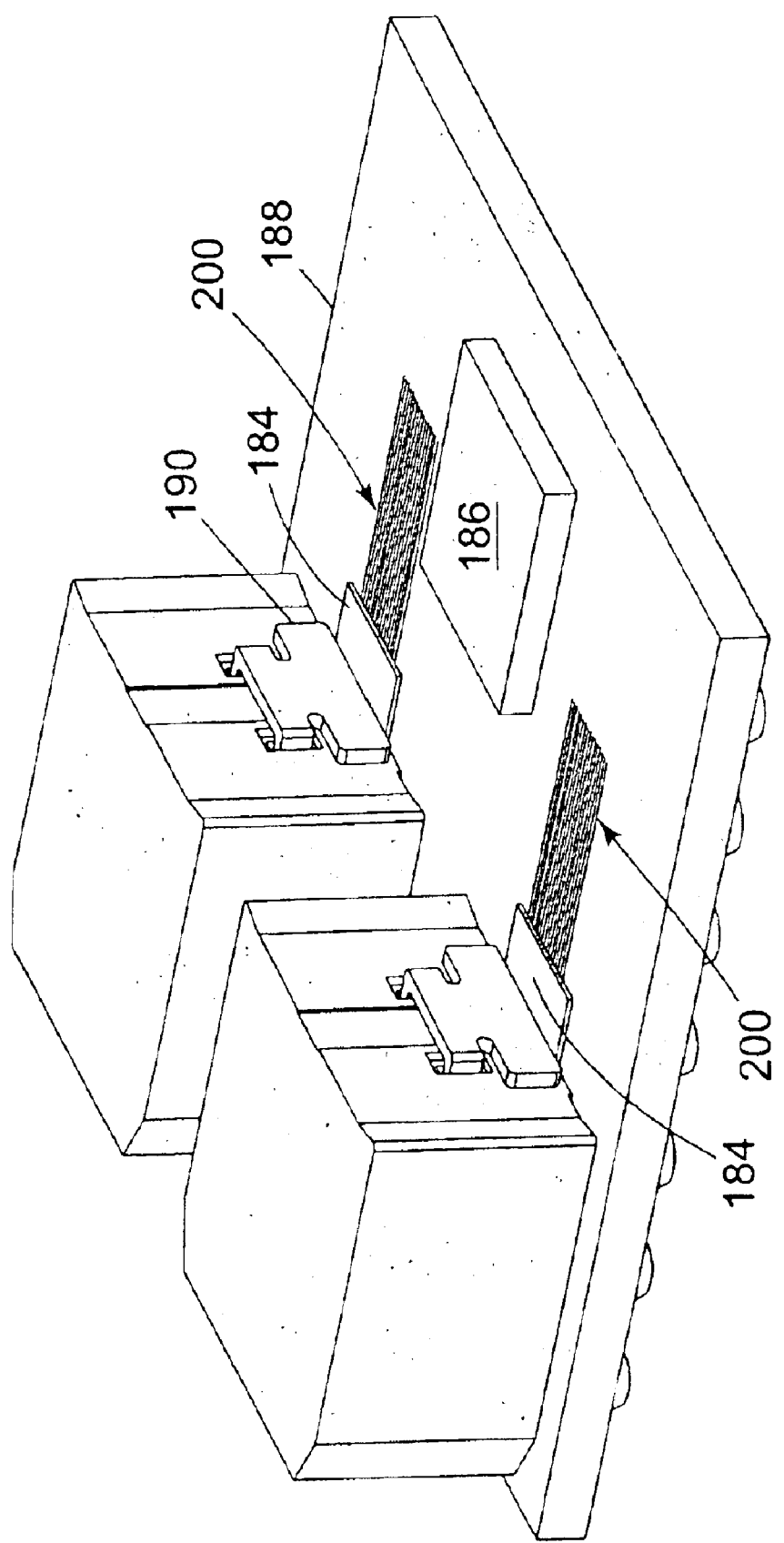
FIG. 5 is a back/side isometric view of a pair of receptacles of two opto-electronic connector assemblies such as those illustrated in FIG. 2 mounted on a circuit board.

As may be better appreciated in FIGS. 3–5, a flexible circuit cable 184 is electrically coupled to the opto-electronic device 176. The flex circuit 184 carries electrical signals to and from the opto-electronic device to and from control/driver chips 186 (FIG. 5) mounted on a circuit board 188. During assembly of the receptacle 150, the flex circuit 184 is first attached to the opto-electronic device 176. Traces of the flex circuit 184 are aligned visually to corresponding traces on the chip and then solder bonded.

If greater alignment precision is required, the flex circuit 184 and/or the opto-electronic device 176 may be suitably patterned with solder balls or paste. The flex circuit 184 would then be roughly positioned and the solder balls heated to cause the solder to melt. The surface tension of the molten solder would then be used to move the flex circuit to a final, more precise position.

The combined device/flex assembly is then precisely aligned to a thermode 190, a heatable alignment datum or assembly fixture, illustrated in FIG. 4, using fiducials on the device 176 and the thermode 190. The thermode 190 includes an outer surface that compliments the inner surface of the receptacle cavity 154. The thermode 190 also includes receiving alignment cavities 192 and 194, similar to receiving cavities 124 and 126 in ferrule 110.

A vacuum (not shown) is used to hold the device 176 to the thermode 190. Next, the bonding layer 182 is applied to the receptacle 150 in the attachment area 178 where the device 176 will be bonded. The receptacle 150 is then brought down over the thermode 190 until the receptacle alignment pegs 164 and 166 and thermode alignment cavities 192 and 194 contact. Very precise alignment between the thermode 190 and receptacle is achieved when the receptacle pegs 164 and 166 are inserted into the thermode alignment cavities 192 and 194.

Alternately, the device/flex assembly may be placed directly into the receptacle cavity by using the flat side surface of one or both of the receptacle alignment pegs as fiducials to precisely position the assembly between the pegs.

The receptacle 150 continues to move until the alignment ledges 180 of the back plane 168 of the receptacle 150 contacts the back side of the device 176. Heat or light is applied to the bonding layer 182 that is now between the back plane 168 and the device 176 until the bonding layer 182 is cured and the device 176 is bonded to the receptacle 150. Solder also could be used.

There are numerous design considerations required to make the opto-electronic receptacle 150 functional.

Mechanical coupling, optical coupling and electrical connection all must be accomplished in unison for this assembly to work as intended. Proper mounting of the components during assembly will insure efficient coupling and proper operation. The components of the assembly have been specifically designed with features that provide the required functionality.

First, placement and mounting of the opto-electronic device 176 together with the flex circuit 184 (the optical component) into the receptacle 150 requires precise positioning in lateral directions and well as depth direction. The lateral position of the component may be determined accurately by the fiducials on the thermode 190 and the large diameter alignment features. However, the adhesive bonding technique can affect the depth position. To insure that the component is accurately positioned without adhesive thickness affecting position, the receptacle 150 contains the alignment back plane recess 168 against which the opto-electronic device 176 is placed. The back surface of the backplane 168 is designed to position the component a precise distance into the receptacle 150. Within the backplane 168 is designed the recessed attachment area 178. The attachment area 178 provides a bonding surface for attaching the opto-electronic device 176, as well as a volume for excess adhesive to flow in, thus assuring that excess adhesive will not affect the position of the component. The alignment ledges 180 keep the opto-electronic device from receding into the attachment area 178.

Within the attachment area 178, there also are provided one or more passages through which electrical conductors or conductive adhesives may pass (such as through apertures or passages 196 shown in FIG. 3). The apertures 196 permit electrical connections to be made between the back of the opto-electronic device 176 and the back surface 192 of the receptacle 150.

Examples of VCSELs that are used as light sources for multi-fiber parallel optical interconnects are described "High-Performance, Producible, Vertical-Cavity Lasers for Optical Interconnects", Robert Morgan, Honeywell Technology Center, International Journal of High Speed Electronics and Systems, Vol. 5, No. 4 (1994) 593–623, which is hereby incorporated by reference. The articles describes that VCSELs generally have the +V electrical contact on the light-emitting "top" surface of the wafer or chip, and the ground is on the opposite, or "bottom" surface. Additional wafer processing or packaging steps would be required to route the ground connection to the "top" surface for traditional electrical interconnection, thus raising the cost and potentially reducing the reliability of the packaged device. Accordingly, in the present invention, the connection between the opto-electronic device and the back of the receptacle is made with an electrically conductive clip 191 designed for use with the receptacle 150. The design of clip 191 includes details to protrude from the back of the receptacle 150 through the passages 196, and provide an electrical connection at the back of the opto-electronic device 176 using solder, conductive adhesives, or other acceptable means.

The grounding clip 191 is mounted on an exterior back surface 192 of the receptacle 150. The grounding clip 191 is a one piece, electrically conductive flat clip that is inserted into the back surface 192 of the receptacle 150. In the present embodiment, the clip 191 is made of a metal coated material (e.g., gold-plated phosphur bronze) or a single piece of metal or metal alloy, such as copper, silver, gold, solder or another suitable conductive material. The clip 191 includes connection legs 194 that may be bent generally perpendicular to the main body of the grounding clip 191. The legs 194 include griping features and clip into the through apertures 196 on the back surface 192. Conductive adhesive or solder connects the ground plane (back) of the device 176 to legs 194 of the grounding clip 191 that is inserted into the receptacle 150. The back surface of the clip 191 may be shaped and sized to cover physically any connection openings on the receptacle 150. The clip 191 provides an electrical connection between the opto-electronic device 176 and an electrical circuit that provides operating power and signals to the device 176.

In alternative simple embodiments, the grounding function could be made by a common wire connection. On a smaller scale, the wire might be replaced by a wire bond connection. An alternative embodiment could be a thin, flat, flexible conductor that would be commonly known as a flex circuit. Other alternatives are possible, such as conductive polymers and conductive adhesives.

In the present exemplary embodiment, the electrically conductive clip design is chosen because the flat clip provides better electrical conductivity and connection, and superior mechanical properties.

The electrically conductive clip 191, when made of appropriate metal, or selectively plated with a desired metal, provides a better electrical connection than conductive polymers or adhesives. Due to the larger surface area of the flat clip design, the clip 191 provides an equivalent, or even better electrical conductor that a simple electrical wire, or a wire bond. Suitable conduction is especially important when the electrical connection required is a ground return connection for multiple electrical signals, and of further importance when the ground return is for extremely fast electrical signals that require a ground plane conductor for proper operation. The larger surface area of the clip also provides ease of connection to the ground circuit on the circuit substrate.

The electrically conductive clip 191 may include extensions or protrusions 198 that protrude below the bottom plane of the receptacle 150. These protrusions 198 may provide electrical connection of the ground to circuit traces 200 on the substrate 188. Inserting the protrusions 198 into connection holes in the circuit substrate 188 may allow electrical connections via solder or electrical contacts to substrate circuit traces 200.

In addition to providing superior electrical properties, the mechanical design of the grounding clip 191 may be used to provide firm mechanical attachment of the receptacle 150 to the circuit substrate 188. In this way, mechanical and electrical connections are made simultaneously. When the receptacle 150 is mounted to the circuit substrate 188, the protrusions 198 may be positioned into holes in the circuit substrate. The receptacle 150 may then be mechanically attached to the substrate by a number of means. For example, the protrusions 198 may be attached by soldering to the substrate, they may be crimped or otherwise mechanically deformed to secure them in holes, or to the opposite side of the circuit substrate 188 if the holes are through holes. Of course combinations of mechanical and solder attachment also may be used.

FIG. 5 illustrates the mounting of a pair of receptacle assemblies 150 onto a ceramic BGA (Ball Grid Array) or circuit board substrate 188 having control/driver chips 186 and associated traces 200. During mounting, the flex circuit 184 first is aligned with the corresponding traces 200 on the BGA 188. The flex circuit may be soldered down or connectorized.

Adhesive is inserted between the receptacle 150 and the BGA 188 and cured, forming a strong, permanent bond. Alternatively, the receptacle 150 may be mechanically attached to the substrate by various means including screws, clamps, etc. The protrusions 198 of the electrically conductive clip 191 also may be used to provide a secure, intermediate mechanical attachment, securing the receptacle until the adhesive applied between the receptacle 150 and substrate 188 is cured. The insertion of the protrusions 198 onto the substrate 188 also increases the mounting strength of the receptacle 150 to the substrate 188. Conductive adhesive is applied between the grounding clip 191 and the top of the flex circuit 184 to complete the grounding of the device 176. The ground connection is made from the back of the opto-electronic device, through the grounding clip 191, to the flex circuit 184.

Figure 7:
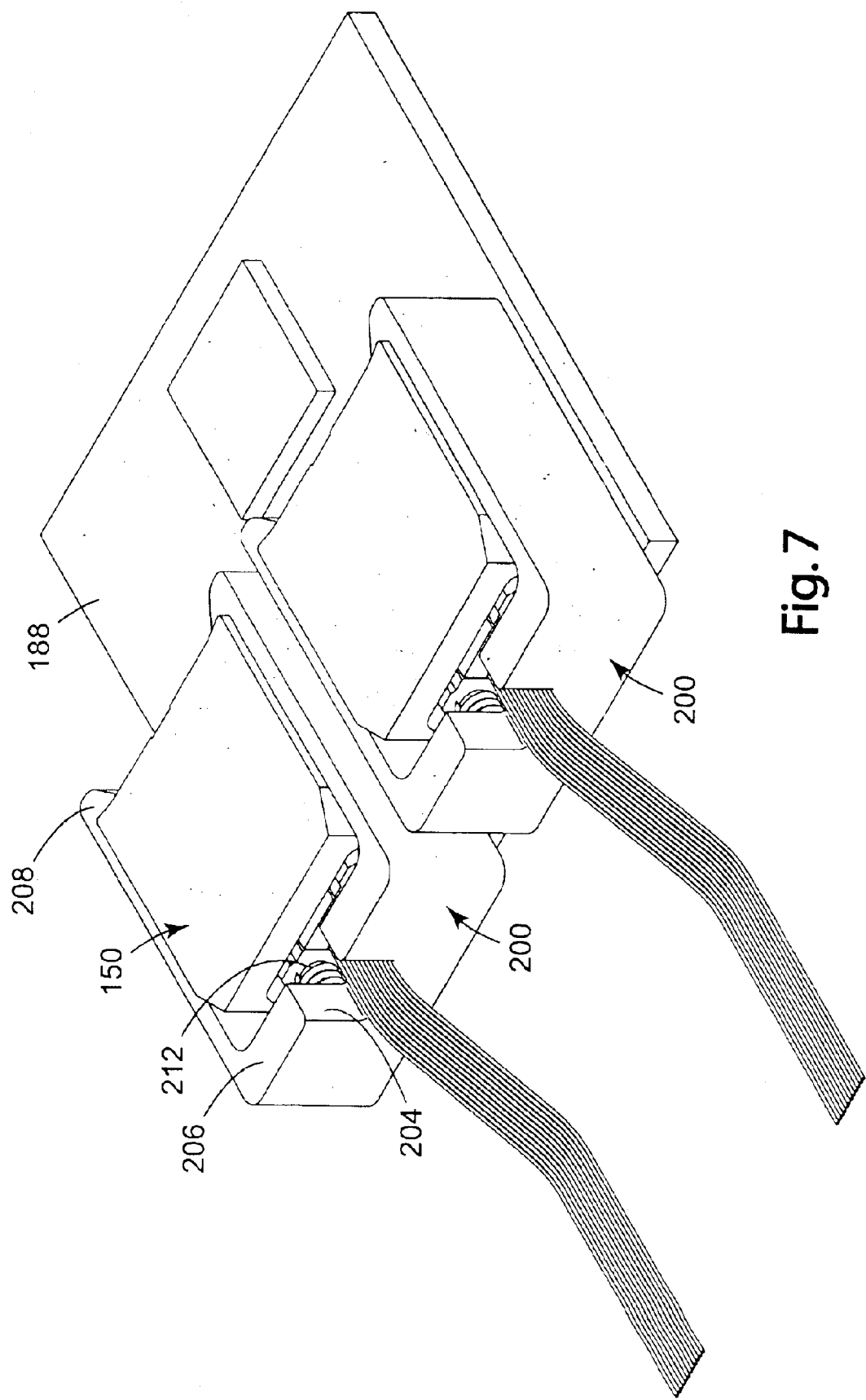
FIG. 7 is a front/side isometric view of the pair of opto-electronic connector assemblies illustrated in FIG. 6, after connectorization.

Referring to FIGS. 6 and 7, two ferrule assemblies 200 are coupled in parallel to the two receptacle assemblies 150 shown in FIG. 5 to form two connector assemblies 100. A latching body 202 is mounted onto the ferrule 110 to complete the ferrule assembly 200. In the present exemplary embodiment, the ferrule 110 includes rear-facing receiving cavities 134 and 136 at a proximal end in FIG. 2, similar to the receiving cavities 124 and 126 at the distal end. The latching body 202 includes a first and a second latching body alignment peg 204 and 206 along an interior back wall and side latches 208. The latching body defines a receptacle-receiving cavity 210. The first and a second latching body alignment pegs 204 and 206 are similar to alignment pegs 164 and 166 and align to rear-facing cavities 134 and 136 in the proximal end of the ferrule 110. Compression springs 212 and 214 are slid over the body pegs 204 and 206 before the ferrule 110 is mounted to the latching body 202. The compression springs 212 and 214 provide a resilient force between the ferrule 110 and the latching body 202.

The ferrule assembly is connected to the receptacle 150 mounted on the BGA 188. As the ferrule 110 is moved horizontally into the receptacle 150, the inner walls of the receptacle 150 coarsely align with the outer sides of the ferrule 110. The tapering lead-in transition portion 156 of receptacle 150 helps the ferrule 110 enter the receptacle 150. The ferrule assembly is pushed into the receptacle. Once the mating face 114 of the ferrule 110 nears the opto-electronic device 176, the receptacle alignment pegs 164 and 166 enter the ferrule receiving holes 124 and 126 and precise alignment of the ferrule 110 to the receptacle 150 is achieved. The ferrule assembly continues to move forward until outer latches 208 of the latching body 202 snap over the receptacle 150. The compression springs 212 and 214 maintain forward force on the ferrule 110, keeping the front mating face 114 in contact with the back plane 168 of the receptacle 150. A minimal amount of space is maintained between the opto-electronic device 176 and the ferrule mating face 114 in order to avoid damage to the device 176.

The larger ended pegs 164 and 166 of the present invention allow for much greater alignment mismatch and more reliable mating. Ease of mating is a significant improvement because many of the applications for the connector, such as a daughtercard connection require "blind mate", that is, visual orientation of the connector prior to engaging is not possible. The advantage is directly proportional to the diameter of the alignment feature; the larger the feature, the more misalignment the rod may accommodate. Similarly, the large alignment pegs help compensate for angular misalignment. An alignment peg with limited protrusion is substantially less susceptible to misalignment based on angular inaccuracies in the alignment holes. In addition, a large diameter alignment rod with limited protrusion is less susceptible to bending and breakage than a thinner, more exposed alignment pin.

Figure 10:
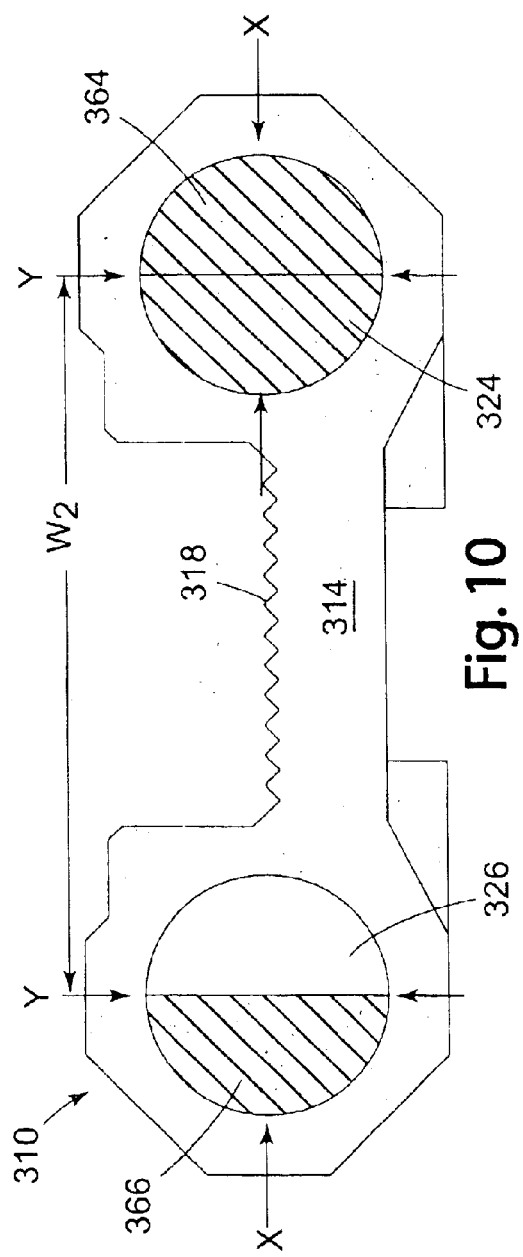
FIG. 10 is an elevation view of the mating face of a second embodiment of a ferrule in accordance with the present invention.

FIGS. 10 and 11 illustrate cross-sectional elevation views of the mating face 314 and 414 of alignment blocks 310 and 410 of alternative second and third embodiments of connectors in accordance with the present invention. Corresponding alignment pegs of complementary alignment blocks are shown by cross-hatched outlines. FIGS. 8, 10 and 11 compare alignment parameters of a full circular and half circle alignment pegs. The ferrule 310, illustrated in FIG. 10, includes a first and a second round receiving cavity 324 and 326. The cavity 324 receives a full-round peg 364. The cavity 326 receives a half-circle peg 366. The alignment block 400 of FIG. 11 includes a first round receiving hole and an elliptical receiving hole 426. The holes 424 and 426 seat two half-circle pins 464 and 466. Arrows indicate constraint along the relevant Y and X axes. As shown in the figures, as long as the exemplary alignment pegs are semi-cylindrical alignment pegs, that is, the outer circumference of the pegs describes at least a half circle, the pegs fully constrain the ferrule in the X and Y coordinates. Half circle pegs are equally as good at alignment as full-round pegs. As may be seen in FIGS. 11 and 13, only one peg and hole combination (e.g., 424 and 464) is necessary to constrain both the x-axis and the y-axis freedom of movement.

The half-circular pegs illustrated in FIGS. 8, 9 and 11 not only offer all of the alignment benefits of large diameter rods, but also offer a more compact profile. As illustrated in FIGS. 8, 10 and 11, if the pin center spacing $W_1$, and $W_2$ and $W_3$ were equal, the half pins allow more area for placement of electronic chips, wider optical fiber arrays, etc. between the pegs, without increasing the width of the alignment block and the connector assembly. The half pin alignment receiving holes may mimic the shape of the half pegs (as shown in FIG. 8) or may remain as circular or elliptical holes (FIGS. 10 and 11). Semi-circular receiving cavities, such as those in the embodiment shown in FIG. 8, allow for the alignment pegs and holes to be closer together for a given pin diameter ($W_1 < W_3$), resulting in a smaller overall connector.

Figure 13:
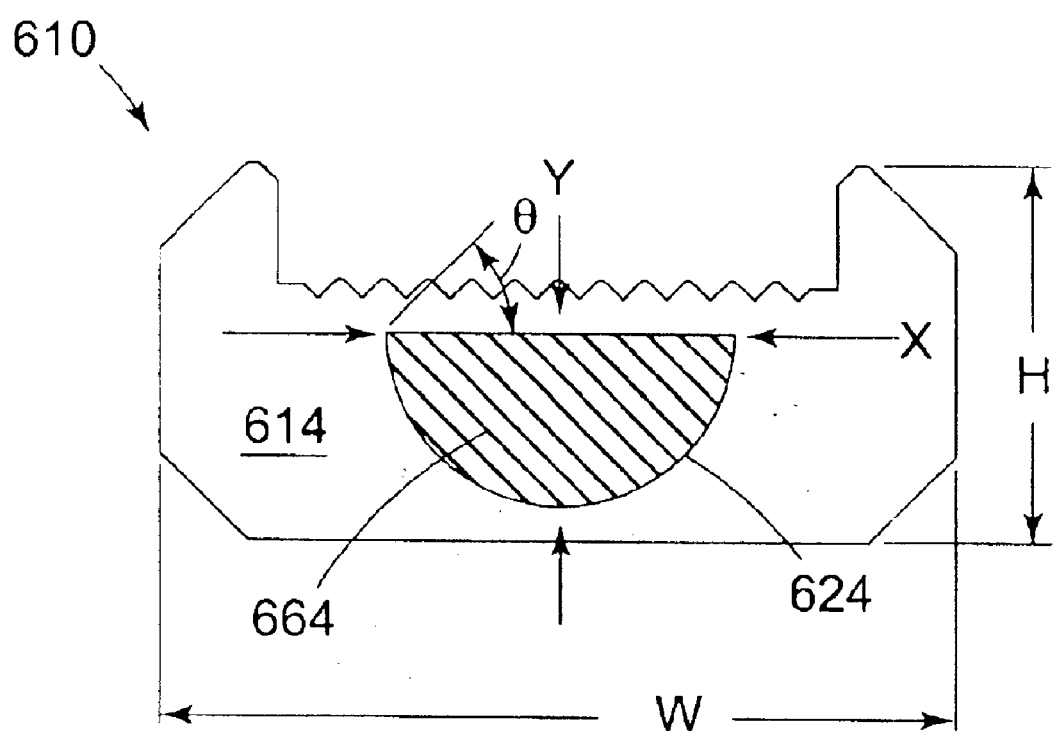
FIG. 13 is an elevation view of the mating face of a fifth embodiment of a ferrule in accordance with the present invention.

FIG. 12 shows an alternative fourth embodiment of a connector having an alignment block 510 in accordance with the present invention. In this example, the alignment block 510 defines a first seating large diameter aperture 524 that receives a large diameter ($p_1 \leq 2D_1$) semi-cylindrical peg 564 (hatched cross-section). The large diameter peg 564 and the aperture 524 constrain the Y direction for one side of the alignment block 510 and the X direction overall. However, since the ferrule 510 accommodates an array of parallel optical fibers, possible misalignment may occur due to rotational angular movement in the θ direction about the center of aperture 524. This rotational movement may be constrained by the use of a second large diameter pin, such as shown in the embodiments of FIGS. 8, 10 and 11 or by controlling the shape of the aperture as shown in the embodiment of FIG. 13. In the present embodiment, a second rectangular receiving cavity 526 seats a peg 566. The small diameter pin 566 constrains the Y direction (more accurately rotational angular direction (θ)) for the other side. Hence, the alignment block again is constrained in the relevant X and Y directions. Furthermore, the use of a smaller pin 566 allows reduced dimensions and greater inter-peg spacing, while providing a keying feature to control the orientation of the connector mating.

FIG. 13 illustrates yet another embodiment of a connector in accordance with the present invention. The connector includes a first alignment block 610 and a second alignment block having a single semi-cylindrical large-diameter alignment peg 664 shown in cross-hatched cross section. The first alignment block 610 includes a matching semi-circular receiving cavity 624. As shown in FIG. 13, the half-round pin and hole combination fully confines the alignment blocks along the horizontal (X), vertical (Y) and angular (θ) directions. The benefits include: (a) less precision features and tolerances needed; (b) alignment blocks and connector assembly may be narrower in width (W); (c) alignment blocks and connector assembly may be shorter in height (H) depending on peg size and shape; and (d) centralized alignment divides tolerance issues in half for an optical fiber array.

Those skilled in the art will appreciate that the present invention may be used when coupling a variety of optical devices and even non-optical devices that require precise alignment. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A fiber optic connector comprising:
   a) a first connector ferrule; and
   b) partial peg alignment means for aligning the first connector ferrule with a matching second connector ferrule, wherein the partial peg alignment means comprises at least one semi-cylindrical protruding alignment peg extending from the first connector ferrule, the alignment peg having a diameter $D_1$ and protruding a protrusion distance $p_1$, wherein $p_1 \leq 2D_1$.

2. The fiber optic connector of claim 1, wherein the first connector ferrule comprises a first alignment block including
   a) a first mating surface;
   b) wherein the partial peg alignment means comprises at least one semi-cylindrical protruding alignment peg extending from the mating surface, the alignment peg having a diameter $D_1$ and protruding from the mating surface a protrusion distance $p_1$, wherein $p_1 \leq 2D_1$.

3. The fiber optic connector of claim 1, wherein the first connector ferrule comprises a first alignment block including a first mating surface and further comprising a second alignment block having a second mating surface defining a first receiving cavity aligned opposite the first alignment peg, the first receiving cavity having a depth H1 wherein and p1<H1.

4. A fiber optic connector comprising:
   a first connector ferrule; and
   b) partial peg alignment means for aligning the first connector ferrule with a matching second connector ferrule, wherein the partial peg alignment means has a hemispherical tip.

5. The fiber optic connector of claim 1, wherein $0.5D_1 \leq p_1 \leq 2D_1$.

6. The fiber optic connector of claim 1, wherein the partial peg alignment means is molded as part of the first connector ferrule.

7. The fiber optic connector of claim 1, wherein the first connector ferrule defines a seating orifice and the partial peg alignment means comprises a metal rod seated in the orifice.

8. The fiber optic connector of claim 1, wherein the first connector ferrule is a receptacle further comprising an opto-electronic device.

9. The fiber optic connector of claim 2, further comprising a second partial peg alignment means extending from one of the alignment blocks and a second receiving cavity defined by the other alignment block, wherein the second receiving cavity is configured to align with and receive the second peg alignment means.

10. The fiber optic connector of claim 9, wherein the second peg alignment means is semi-cylindrical, the second peg alignment means having a diameter $d_2$ and protruding from the mating surface of the one alignment block a protrusion distance $p_2$, wherein $p_2 \leq 2d_2$, and wherein the second receiving cavity has a depth $H_2$, wherein $p_2 < H_2$.

11. The fiber optic connector of claim 9, wherein the first alignment block includes both the first and the second peg alignment means, the first and second peg alignment means having a convex outer edge portion and a non-convex outer edge portion, wherein the non-convex edge portions of the first and second peg alignment means are opposite to each other.

12. The fiber optic connector of claim 11, further comprising an optical fiber array placed between the opposing non-convex edge portions.

13. The fiber optic connector of claim 11, further comprising an opto-electronic device placed between the opposing non-convex edge portions.

14. The fiber optic connector of claim 11, wherein the second alignment block includes the first and the second receiving cavities, the first and second cavities having a concave interior edge portion and a non-concave interior edge portion, wherein the non-concave interior edge portions of the first and second cavities are opposite each other.

15. The fiber optic connector of claim 14, further comprising an optical fiber array placed between the opposing non-concave interior edge portions.

16. A connector assembly comprising:
   a) a first connector having a first alignment block;
   b) a second connector having a second alignment block; and
   c) at least one large diameter partial profile alignment means for aligning the first alignment block and the second alignment block, wherein the large diameter partial profile alignment means comprises at least one semi-cylindrical protruding alignment peg extending from the first connector, the alignment peg having a diameter $D_1$ and protruding a protrusion distance $p_1$ wherein $p_1 \leq 2D_1$.

17. The connector assembly of claim 16, wherein the first connector comprises a first alignment block including
   a) a first mating surface;
   b) wherein the large diameter partial profile alignment means comprises at least one semi-cylindrical protruding alignment peg extending from the mating surface, the alignment peg having a diameter $D_1$ and protruding from the mating surface a protrusion distance $p_1$, wherein $p_1 \leq 2D_1$.

18. The connector assembly of claim 16,
   a) wherein the first connector comprises a first alignment block including a first mating surface and the second connector comprises a second alignment block having a second mating surface defining a first receiving cavity aligned opposite the large diameter partial profile alignment means;
   b) the first receiving cavity having a depth $H_1$ wherein and $p_1 < H_1$.

19. The connector assembly of claim 16, wherein the large diameter partial profile alignment means has a hemispherical tip.

20. The connector of claim 17, wherein $0.5D_1 \leq p_1 \leq 2D_1$.

* * * * *

UNITED STATES PATENT AND TRADEMARK OFFICE
CERTIFICATE OF CORRECTION

PATENT NO. : 6,805,493 B2
DATED : October 19, 2004
INVENTOR(S) : Igl, Scott A.

It is certified that error appears in the above-identified patent and that said Letters Patent is hereby corrected as shown below:

Title page,
Item [56], References Cited, FOREIGN PATENT DOCUMENTS, delete "Hei 5-20340" and insert -- Hei 5-165434 -- therefor.
OTHER PUBLICATIONS, delete "Proucible" and insert -- Producible -- therefor.

Column 13,
Line 40, insert -- a)   -- before "a first mating surface".

Column 14,
Line 37, after "$p_1$" insert -- , --.

Signed and Sealed this

Twelfth Day of April, 2005

JON W. DUDAS
*Director of the United States Patent and Trademark Office*